United States Patent
Shoji et al.

(10) Patent No.: US 10,085,001 B2
(45) Date of Patent: Sep. 25, 2018

(54) METHOD AND APPARATUS FOR DETECTING AND MITIGATING MECHANICAL MISALIGNMENTS IN AN OPTICAL SYSTEM

(71) Applicant: Omron Corporation, Kyoto (JP)

(72) Inventors: Takeshi Shoji, Hirai Kusatsu (JP); John Drinkard, Foster City, CA (US); Ambrish Tyagi, Palo Alto, CA (US)

(73) Assignee: Omron Corporation, Kyoto (JP)

( * ) Notice: Subject to any disclaimer, the term of this patent is extended or adjusted under 35 U.S.C. 154(b) by 465 days.

(21) Appl. No.: 14/661,603

(22) Filed: Mar. 18, 2015

(65) Prior Publication Data

US 2015/0271474 A1 Sep. 24, 2015

Related U.S. Application Data

(60) Provisional application No. 61/968,470, filed on Mar. 21, 2014.

(51) Int. Cl.
*H04N 13/00* (2018.01)
*H04N 13/02* (2006.01)
*G06T 7/80* (2017.01)

(52) U.S. Cl.
CPC .......... *H04N 13/0246* (2013.01); *G06T 7/80* (2017.01); *G06T 7/85* (2017.01); *H04N 13/0239* (2013.01);
(Continued)

(58) Field of Classification Search
CPC .......... H04N 13/0246; H04N 13/0239; H04N 13/0296; G06T 7/80; G06T 7/85
(Continued)

(56) References Cited

U.S. PATENT DOCUMENTS 5,862,517 A 1/1999 Honey et al.
6,385,334 B1 * 5/2002 Saneyoshi .......... H04N 13/0011
348/E13.014
(Continued)

FOREIGN PATENT DOCUMENTS

CN 1691777 A 11/2005
CN 102119317 A 7/2011
(Continued)

*Primary Examiner* — David Harvey
(74) *Attorney, Agent, or Firm* — Murphy, Bilak & Homiller, PLLC

(57) ABSTRACT

According to one aspect of the teachings herein, a method and apparatus detect mechanical misalignments in a machine vision system during run-time operation of the machine vision system, and compensate image processing based on the detected misalignments, unless the detected misalignments are excessive. Excessive misalignments may be detected by determining a worst-case error based on them. If the worst-case error exceeds a defined limit, the machine vision system transitions to a fault state. The fault state may include disrupting operation of a hazardous machine or performing one or more other fault-state operations. Among the detected misalignments are internal misalignments within individual cameras used for imaging, and relative misalignments between cameras. The method and apparatus may further perform run-time verifications of focus and transition the machine vision system to a fault state responsive to detecting insufficient focal quality.

14 Claims, 6 Drawing Sheets

(52) U.S. Cl.
CPC ............ *H04N 13/0296* (2013.01); *G06T 2207/10012* (2013.01); *G06T 2207/30108* (2013.01); *G06T 2207/30204* (2013.01); *H04N 2013/0096* (2013.01)

(58) Field of Classification Search
USPC .......................................................... 348/47
See application file for complete search history.

(56) References Cited

U.S. PATENT DOCUMENTS

| | | | |
|---|---|---|---|
| 6,621,921 B1 | 9/2003 | Matsugu et al. | |
| 6,674,892 B1 * | 1/2004 | Melen ..................... | G06K 9/03 348/42 |
| 6,728,582 B1 * | 4/2004 | Wallack ............ | G05B 19/41875 382/153 |
| 8,494,307 B2 * | 7/2013 | Thorpe ..................... | G06T 7/85 382/151 |
| 9,060,164 B2 * | 6/2015 | Wu ....................... | H04N 17/002 |
| 2002/0168091 A1 * | 11/2002 | Trajkovic ............... | H04N 19/51 382/107 |
| 2007/0081714 A1 * | 4/2007 | Wallack ................. | G06K 9/209 382/152 |
| 2008/0089557 A1 * | 4/2008 | Iwaki ....................... | G01C 3/06 382/106 |
| 2008/0123938 A1 * | 5/2008 | Kim ........................ | G06T 7/97 382/154 |
| 2008/0231691 A1 * | 9/2008 | Larson ................... | H04N 13/04 348/56 |
| 2009/0058878 A1 * | 3/2009 | Sasagawa ........... | H04N 13/0022 345/593 |
| 2009/0066968 A1 | 3/2009 | Ikeda et al. | |
| 2009/0128621 A1 * | 5/2009 | Passmore ........... | H04N 13/0018 348/43 |
| 2010/0166294 A1 * | 7/2010 | Marrion ............. | G06K 9/00214 382/154 |
| 2011/0157373 A1 * | 6/2011 | Ye .............................. | G06T 7/85 348/187 |
| 2012/0086779 A1 * | 4/2012 | Morifuji ............ | H04N 13/0239 348/46 |
| 2012/0236125 A1 * | 9/2012 | Umezawa .............. | G01C 3/085 348/47 |
| 2012/0274627 A1 * | 11/2012 | Huggett .................... | G06T 7/85 345/419 |
| 2013/0010084 A1 * | 1/2013 | Hatano .................. | G03B 35/08 348/47 |
| 2013/0016186 A1 * | 1/2013 | Atanassov ......... | H04N 13/0246 348/47 |
| 2013/0151135 A1 * | 6/2013 | Aubrey .................... | G08G 1/00 701/118 |
| 2013/0235162 A1 * | 9/2013 | Hsieh ................. | H04N 13/0239 348/47 |
| 2013/0335259 A1 * | 12/2013 | Yasugi .................. | G01S 13/867 342/52 |
| 2013/0335579 A1 * | 12/2013 | Raghavan .......... | G06K 9/00825 348/188 |
| 2014/0071281 A1 * | 3/2014 | Wu ....................... | H04N 17/002 348/148 |
| 2014/0300704 A1 * | 10/2014 | Ramaswamy .......... | G06T 7/002 348/48 |
| 2016/0330427 A1 * | 11/2016 | Nam .................. | H04N 13/0007 |

FOREIGN PATENT DOCUMENTS

| | | |
|---|---|---|
| CN | 102782721 A | 11/2012 |
| JP | 2006294854 A | 10/2006 |
| JP | 2009053136 A | 3/2009 |
| JP | 2013515959 A | 5/2013 |
| WO | 2013056016 A1 | 4/2013 |

* cited by examiner

METHOD AND APPARATUS FOR DETECTING AND MITIGATING MECHANICAL MISALIGNMENTS IN AN OPTICAL SYSTEM

RELATED APPLICATIONS

This application claims priority under 35 U.S.C. 119(e) from the U.S. provisional patent application filed on 2014 Mar. 21 and assigned Application No. 61/968,470, which application is incorporated herein by reference.

TECHNICAL FIELD

The present invention generally relates to optical systems, such as may be included in a machine vision system or other optoelectronic system, and particularly relates to detecting and mitigating mechanical misalignments in optical systems.

BACKGROUND

Optical systems find widespread use in various industries. Optoelectronic systems in particular provide valuable monitoring and object detection capabilities, including in safety-critical applications. As an example, single- or multi-camera imaging systems may be used to monitor or "guard" the area around an industrial robot, metal press, or other hazardous machine, and to provide emergency-stop signaling in response to detecting the intrusion of a human being into the guarded, hazardous area.

Many machine vision systems use stereoscopic vision or multi-camera imaging, which involves two or more cameras having overlapping fields of view. By viewing the same object or objects from different viewing angles, the observed disparity between the positions of objects in respective ones of the multiple views provides a basis for computing distances to those objects. In an example case, a machine vision system uses stereoscopic image processing to detect objects in a monitored zone and to calculate the distances to those objects. Such detection may be safety critical, such as when the monitored zone represents a dangerous area or volume around an industrial machine and the machine vision system is relied upon for detecting the encroachment of objects into the monitored area. Here, the term "objects" can be broadly understood to include humans.

The accuracy and overall performance of a machine vision system depends on a number of critical mechanical alignments. Consider FIG. 1, for example, which depicts an example lens 6 and image sensor 8—"imager 8"—as might be included within a sensor head or other camera assembly of a machine vision system. Within the limits of the applicable manufacturing precision and tolerances, the camera assembly fixes the relative positioning of lens 6 and the imager 8, which may be Charge Coupled Device, CCD, or other pixel array.

These key alignments are better understood in the context of FIG. 2, which shows the image plane of the imager 8, in relation to the focal plane of the lens 6. Absent misalignment problems, the camera assembly fixes the image plane parallel to the focal plane and fixes the image plane at the proper distance d from the focal plane.

However, as a consequence of aging, thermal expansion, vibration, impact, etc., various kinds of mechanical misalignments may be introduced, such as a relative shifting or translation of the imager 8 relative to the lens 6 in a direction perpendicular to the optical axis. These side-to-side shifts, whether arising from movement of the lens 6 or imager 8, or both, move the optical center or origin R of the image plane off of the optical axis and out of alignment with the optical center or origin O of the focal plane.

Additionally, the lens 6 and/or imager 8 may shift along the optical axis. These shifts, which are referred to as longitudinal translations, change the distance d between the lens 6 and the imager 8. Longitudinal translations effectively change the magnification or focal length of the camera assembly.

As a further example of misalignment, the imager 8 may rotate about the optical axis. Such rotation effectively rotates the image projection from the lens 6 onto the image plane. Still further, any relative tilting of the lens 6 and/or imager 8 will cause the image plane to no longer be parallel with the focal plane. Tilting changes the image projection onto the image plane and, like the other, foregoing misalignments, degrade the ability of the machine vision system to accurately process the images obtained from its cameras.

Further issues arise in the context of focal quality and/or contrast. The lens 6 may have, for example, a focal quality profile wherein the focal quality of the lens 6 is highest at the lens center and lowest at the edges of the lens. FIG. 3 depicts an example focal quality profile for the lens 6.

While the focal quality profile of the lens 6 generally will be such that the minimum focal quality of the lens is acceptable, at least under nominal operating conditions, misting, fogging, oiling, dusting, etc., on the lens 6 and/or imager 8, will degrade the focal quality and/or contrast seen in the images acquired from the imager 8. Other environmental changes, such as changes in scene lighting may also degrade contrast or other image parameters.

SUMMARY

According to one aspect of the teachings herein, a method and apparatus detect mechanical misalignments in a machine vision system during run-time operation of the machine vision system, and compensate image processing based on the detected misalignments, unless the detected misalignments are excessive. Excessive misalignments may be detected by determining a worst-case error based on them. If the worst-case error exceeds a defined limit, the machine vision system transitions to a fault state. The fault state may include disrupting operation of a hazardous machine or performing one or more other fault-state operations. Among the detected misalignments are internal misalignments within individual cameras used for imaging, and relative misalignments between cameras. The method and apparatus may further perform run-time verifications of focus and transition the machine vision system to a fault state responsive to detecting insufficient focal quality.

In an example embodiment, a machine vision system operating in a run state implements a method that includes obtaining a pair of images or current frame from first and second cameras that comprise a stereo camera pair and image a scene containing one or more reference markers. The method includes estimating mechanical misalignments in and/or between the first and second cameras, based on comparing current reference marker positions to original reference marker positions. Here, the current reference marker positions are determined from the current frame, while the original reference marker positions are known from setup data stored in the machine vision system. The method further includes calculating a worst-case error for stereo vision processing by the machine vision system, as a function of the estimated mechanical misalignments, and transitioning the machine vision system from the run state of operation to a fault state of operation, in response to determining that the worst-case error exceeds a defined threshold.

In another example embodiment, a machine vision system includes interface circuitry configured to obtain images from first and second cameras comprising a stereo camera pair and imaging a scene containing one or more reference markers. The machine vision system further includes processing circuitry that is operatively associated with the interface circuitry and, during run state operation of the machine vision system, configured to estimate mechanical misalignments in and/or between the first and second cameras. The estimations are based on the processing circuitry comparing current reference marker positions to original reference marker positions, and the processing circuitry is configured to calculate a worst-case error for stereo vision processing by the machine vision system, as a function of the estimated mechanical misalignments. The processing circuitry is further configured to transition the machine vision system from the run state of operation to a fault state of operation, in response to determining that the worst-case error exceeds a defined threshold.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
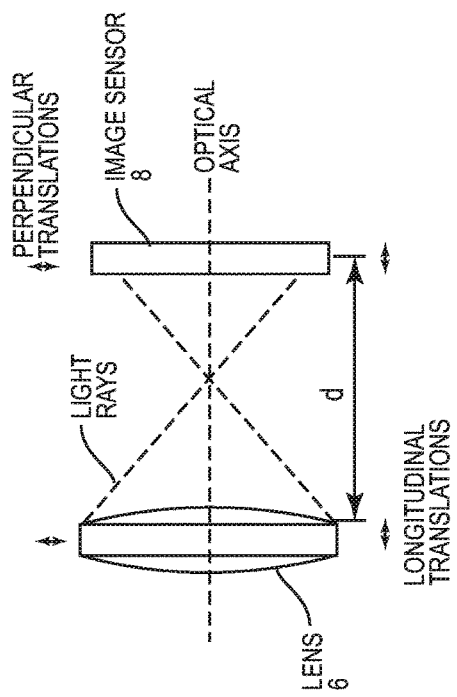
FIG. 1 is a diagram of an example lens and image sensor within a camera assembly, and illustrates key mechanical alignments between them.
Figure 2:
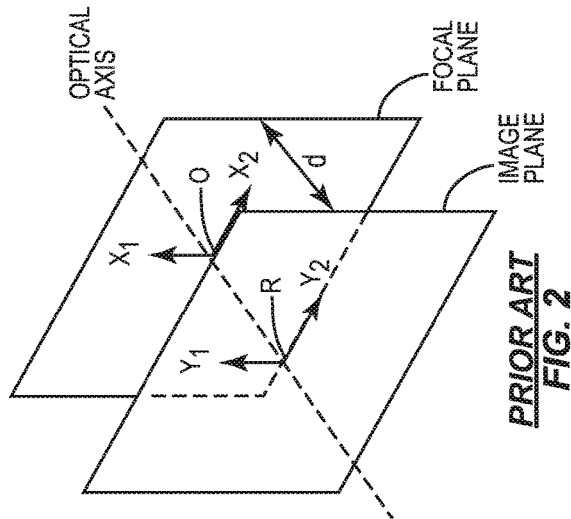
FIG. 2 is a diagram of focal and image planes corresponding to the lens and image sensor of FIG. 1, and illustrates further aspects of mechanical alignment between the lens and the image sensor.
Figure 3:
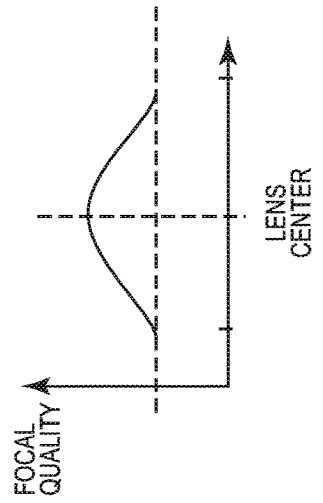
FIG. 3 illustrates an example focal quality profile for a camera lens.
Figure 4:
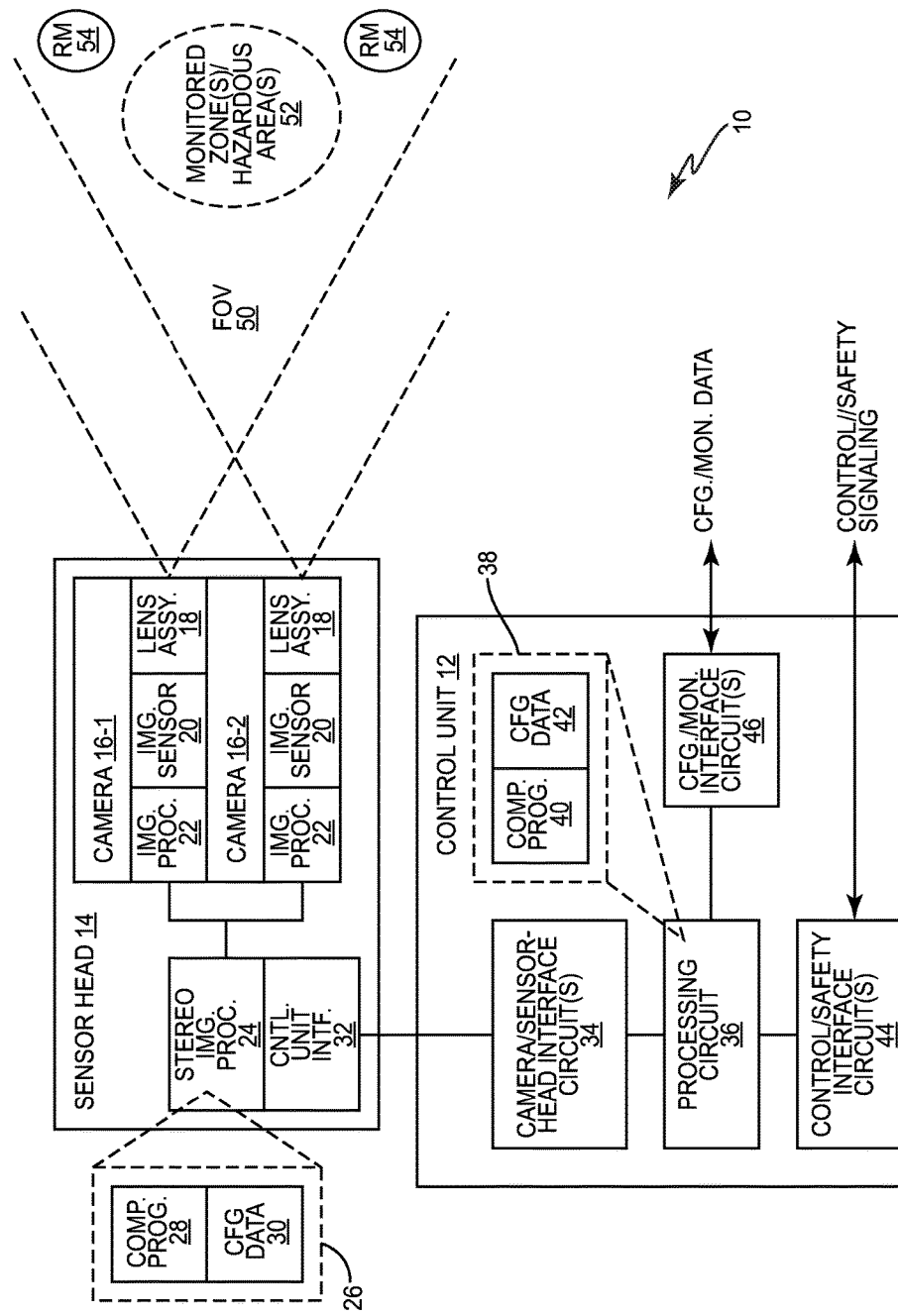
FIG. 4 is a block diagram illustrating one embodiment of a machine vision system, according to the teachings herein.

FIG. 4 is a block diagram of an apparatus 10 according to one embodiment. The apparatus 10, which is hereafter referred to as the "machine vision system 10," includes a control unit 12 and one or more sensor heads or SHs 14. As a matter of convenience, only one sensor head 14 is illustrated. However, in one or more embodiments, the control unit 12 may be communicatively coupled to two or more such sensor heads 14, e.g., sensor heads 14-1, 14-2, and so on.

Each sensor head 14 provides multi-view imaging capability, e.g., stereoscopic imaging capability. In the example embodiment, the sensor head 14—which also may be referred to as a camera head or camera unit—includes first and second camera assemblies 16-1 and 16-2, which are operated as a stereo camera pair. The camera assemblies 16-1 and 16-2 are hereafter simply referred to as cameras 16-1 and 16-2 or simply as "camera 16" or "cameras 16" unless the suffixes are needed for clarity.

Each camera 16 includes a lens assembly 18 comprising one or more lenses, an imager 20 that is placed in precise optical alignment with the lens assembly 18, and an image processor 22, which may be a pre-processor or other processing circuit configured to operate the imager 20, provide read-out of image sensor data, control exposure times, etc. Hereafter, each lens assembly 18 is simply referred to as "the lens 18" and each image sensor 20 is simply referred to as "the imager 20."

The sensor head 14 further includes a stereo image processing circuit 24, which may comprise one or more microprocessor-based, DSP-based, ASIC-based, and/or FPGA-based circuits. Broadly, the stereo image processing circuit 24 comprises digital processing circuitry that is configured to perform stereo image correlation processing for stereo images as captured by the cameras 16-1 and 16-2. Notably, the stereo image processing circuit 24 in one or more embodiments more generally performs multi-view image processing, such as generating depth maps, determining ranges to objects within the imaged scene, etc., for cases where the sensor head 14 includes more than two cameras 16.

In an example embodiment, the stereo image processing circuit 24 receives successive images, also referred to as "frames," from each of the cameras 16-1 and 16-2. Here, a "frame" or "image" comprises the image data, e.g., pixel data, from the involved imager 20 for a given image capture. For example, the stereo image processing circuit 24 receives a pair of images, one from the first camera 16-1 and one from the second camera 16-2, during each one in a succession of capture intervals. The frame rate or capture rate determines the rate at which new images are captured by the cameras 16.

The stereo image processing circuit 24 performs 3D ranging for the captured images, based on performing correlation processing across corresponding image pairs from the two cameras 16-1 and 16-2. The two cameras 16-1 and 16-2 may be disposed along a horizontal line at some separation distance, for operation as left-image and right-image cameras. The "disparity" or displacement seen between the pixel position(s) in the left image and the right image, for the same imaged object or feature, provides the basis for determining 3D ranging information, as is understood by those of ordinary skill in the art. The horizontal distance between the two cameras 16-1 and 16-2 may be referred to as a "baseline."

In one or more embodiments, the stereo image processing circuit 24 includes or is associated with a storage device 26. The storage device 26 will be understood as comprising a type of computer-readable medium—e.g., FLASH memory or EEPROM—that provides non-transitory storage for a computer program 28 and one or more items of configuration data 30 on a non-transitory basis. Here, "non-transitory" does not necessarily mean permanent or unchanging storage, and may include volatile storage, but does mean storage of some defined persistence and excludes mere propagating signals.

In some embodiments, the stereo image processing circuit 24 is specially adapted to carry out the corresponding processing taught herein, based on its execution of computer program instructions comprising the computer program 28. Further, the configuration data 30 comprises, for example, operational configuration settings, such as 3D distances or ranges used to define monitoring boundaries or other critical object-detection distances.

The sensor head 14 further includes a control unit interface circuit 32, which communicatively couples the control unit 12 to the sensor head 14, thereby allowing the sensor head 14 to provide image data and/or derived object detection data to the control unit 12, and allowing the control unit 12 to provide the sensor head 14 with the configuration data 30 and/or information used to derive the configuration data 30. Of course, further signaling, e.g., testing, etc., may be carried between the control unit 12 and the sensor head 14.

The control unit 12 thus includes a corresponding sensor head interface circuit or circuits 34, for interfacing the control unit 12 to essentially any number of sensor heads 14. The control unit 12 further comprises a processing circuit 36, which in one or more embodiments includes or is associated with a storage device 38 that provides non-transitory storage for a computer program 40 and configuration data 42. The storage device 38 comprises a computer-readable medium, such as FLASH or EEPROM, which provides non-transitory storage for the computer program 40 and the configuration data 42.

Here, the configuration data 42 may be received from a user (or user device), or may be derived from such information, and it may overlap with or provide the basis for deriving the configuration data 30 in the sensor head(s) 14. The configuration data 42 comprises, for example, monitoring zone definitions, and control behavior definitions, e.g., defining how the control unit 12 responds to object detections indicated by the sensor head(s) 14, including when and which control signals are output from the control unit 12. Such signaling is output from control/safety interface circuit(s) 44 and the data from the user (user device, such as a laptop computer) is exchanged via configuration and/or monitoring interface circuit(s) 46.

In some embodiments, the processing circuit 36 comprises one or more microprocessors, DSPS, ASICs, FPGAs, or other digital processing circuits. More broadly, the processing circuit 36 comprises fixed circuitry or programmed circuitry, or some combination of fixed and programmed circuitry. In at least one embodiment, e.g., where the processing circuit 36 comprises one or more microprocessors or other programmable circuitry, the processing circuit 36 is specially adapted to operate according to the teachings herein, based on its execution of the computer program instructions comprising the computer program 40.

With the above in mind, the sensor head 14 provides imaging for an overlapping field of view (FOV) 50 via its stereo imaging pair of cameras 16-1 and 16-2. Of course, the machine vision system 10 may have additional cameras 16 having further, at least partially, overlapping FOVs 50. The configuration data 42 defines one or more monitored or hazardous zones 52—e.g., in terms of 3D ranges or coordinates defining a bounded area or bounded volume.

There may be, e.g., a warning zone and a critical "stop" or shutdown zone. For example, the warning zone may be defined as beginning at a distance of six meters from a hazardous machine being monitored by the machine vision system 10 and extending to a distance of two meters from the machine, at which distance the shutdown zone begins.

In an example configuration, objects detected at coordinate positions within the warning zone cause the machine vision system 10 to output one or more warning signals and/or log corresponding detection data, etc. Conversely, objects detected at coordinate positions within the critical stop zone cause the machine vision system 10 to output one or more machine-stop and/or other safety-critical signals.

Note that the FOV 50 has one or more reference markers 54 placed within it, e.g., on a portion of the floor lying within the FOV 50. The reference markers 54 (RMs) may be of a known size, shape, color, and/or patterning, such that they are recognized as RMs 54 by the machine vision system 10. In at least one embodiment, the stereo image processing circuit 24 in the sensor head 14 is configured to recognize RMs 54 in the pixel data comprising the stereo image pairs output from the cameras 16-1 and 16-2. The same functionality may be provided in the processing circuit 36 of the control unit 12, at least in embodiments where image data is conveyed from the sensor head 14 to the control unit 12. The configuration data 30 and/or 42 includes, for example, information indicating known or expected attributes of the RMs 54, such as size, color, shape, pattern details, and position within the FOV 50, e.g., coordinates corresponding to the locations of the RMs 54.

With the above in mind, in an example embodiment, the machine vision system 10 includes interface circuitry configured to obtain a pair of images from first and second cameras 16-1 and 16-2. Here, the pair of images comprises a current frame—i.e., the current stereo pair of images from the cameras 16-1 and 16-2, with one image from the first camera 16-1 and one image from the second camera 16-2. Here, it is assumed that the first and second cameras 16-1 and 16-2 image a scene containing one or more RMs 54.

The machine vision system 10 further includes processing circuitry operatively associated with the interface circuitry. If the processing circuitry is consolidated in the sensor head 14 containing the first and second cameras 16-1 and 16-2, e.g., the stereo image processing circuit 24, the interface circuitry will be understood as comprising interface circuitry in the stereo image processing circuit 24 and/or in the respective image processors 22 that read in the image data from the imagers 20. If the processing circuitry is consolidated in the control unit 12, e.g., the processing circuit 36, the interface circuitry will be understood as comprising the interface circuit(s) 34 that communicatively couple the control unit 12 to the sensor head 14. For convenience with reference to these possibilities, the processing circuitry will be referred to as "the processing circuitry 24 and/or 36," or simply as the "processing circuitry 24, 36." Both designations should be understood as denoting "and/or" unless a different meaning is stated or apparent from the context.

During run state operation of the machine vision system, the processing circuitry 24 and/or 36 is configured to estimate mechanical misalignments in and/or between the first and second cameras 16-1 and 16-2, based on comparing current reference marker positions to original reference marker positions. The current reference marker positions are determined from the current frame—i.e., as observed in the image data constituting the current frame—and the original reference marker positions are known from setup data stored in the machine vision system 10. The configuration data 30 and/or the configuration data 42 includes the setup data, for example.

As for estimating the mechanical misalignments, the processing circuitry 24 and/or 36 in one or more embodiments is configured to estimate the mechanical misalignments based on being configured to estimate at least one of: a per-camera imager shift, a per-camera magnification change, a relative rotation between the cameras, and a magnification ratio between the cameras. The per-camera imager shift estimate accounts for, for example, relative translations between the lens 18 and the imager 20 that are perpendicular to the optical axis of the involved camera 16. The per-camera magnification change accounts for changes in the distance between the lens 18 and the imager 20, i.e., translations along the optical axis, and the per camera magnification changes can be used to determine the magnification ratio between the cameras.

While some embodiments of the processing circuitry 24 and/or 36 are configured to estimate all of the above-identified misalignments, it is also contemplated to estimate fewer than all—such as where the processing circuitry 24 and/or 36 only estimates per-camera imager shifts and compensate for detected shifts and/or performs fault processing with respect to the detected shifts.

In any case, the processing circuitry 24 and/or 36 is further configured to calculate a worst-case error for stereo vision processing by the machine vision system 10, as a function of the estimated mechanical misalignments. Still further, the processing circuitry 24 and/or 36 is configured to transition the machine vision system 10 from the run state of operation to a fault state of operation, in response to determining that the worst-case error exceeds a defined threshold. The defined threshold is, for example, defined in the configuration data 30 and/or 42, and the worst-case error relates to the stereo correlation performance of the machine vision system 10, such that excessive mechanical misalignments within either camera 16-1 or 16-2, or between them, cause the machine vision system 10 to transition to a fault state of operation.

In one or more embodiments, the processing circuitry 24 and/or 36 is configured to perform the above-described operations of obtaining, estimating and calculating within a defined response time of the machine vision system 10. The defined response time here is associated with a safety-critical object detection function performed by the machine vision system 10.

In the same or other embodiments, the processing circuitry 24 and/or 36 is configured to repeat the operations of obtaining, estimating and calculating on a per frame basis unless the worst-case error calculated in any given frame exceeds the defined threshold, or the run state of operation the machine vision system 10 is otherwise interrupted.

For example, the machine vision system 10 may check for mechanical misalignments and worst-case error for each frame output by the stereo camera pair—or from each of any number of stereo camera pairs associated with the machine vision system 10. According to this per frame checking, the processing circuitry 24 and/or 36 continues operation of the machine vision system 10 in the run state unless an excessive worst-case error is detected, or another fault occurs, or other operations, such as control signaling incoming to the machine vision system 10, indicates that run state operation should be ended or suspended.

In at least some embodiments, the processing circuitry 24 and/or 36 is configured to obtain filtered estimations of the mechanical misalignments over some number of frames from the first and second cameras 16-1 and 16-2. Correspondingly, the processing circuitry 24 and/or 36 is configured to obtain a filtered worst-case error from the filtered estimations, and transition the machine vision system 10 from the run state of operation to a fault state of operation if the filtered worst-case error exceeds a defined threshold.

For example, the processing circuitry 24 and/or 36 is configured to obtain the filtered estimations of the mechanical misalignments over some number of frames, based on being configured to obtain filtered reference marker positions over some number of frames and obtain the filtered estimations of the mechanical misalignments by calculating the mechanical misalignments in and between the first and second cameras from the filtered reference marker positions. Alternatively, rather than filtering reference marker positions over some number of frames, the processing circuitry 24 and/or 36 is configured to filter the estimated mechanical misalignments, as estimated in each of the involved frames, to obtain the filtered mechanical misalignments.

Generally, in at least one embodiment contemplated herein, the processing circuitry 24 and/or 36 is configured to obtain filtered estimations of the mechanical misalignments over some number of frames from the first and second cameras 16-1 and 16-2. Correspondingly, the processing circuitry 24 and/or 36 is configured to compensate stereo vision processing by the machine vision system 10 with respect to the first and second cameras 16-1 and 16-2, as a function of filtered mechanical misalignments. In at least one such embodiment, the processing circuitry 24 and/or 36 is configured to compensate the stereo vision processing by adapting one or more calibration parameters that are used by the machine vision system 10 in rectifying the pairs of images obtained from the first and second cameras 16-1 and 16-2.

The one or more calibration parameters incorporate or depend on the detected misalignments and the processing circuitry 24 and/or 36 updates related stored value(s) used for disparity determinations and/or other correlation processing between the first and second camera images in the rectified coordinate system. Thus the "apparent" disparity between an object in the first and second camera images, may be compensated for any one or more of detected imager shifts, detected magnification changes in or between the cameras, and detected changes in the relative rotation between cameras.

While FIG. 4 can be understood as illustrating an advantageous example arrangement for the machine vision system 10, other arrangements of processing circuitry, etc., may be used for obtaining and processing frames from a stereo camera pair. Thus, the method 500 seen in FIG. 5 can be understood as being implemented via the fixed and/or programmatic configuration of the machine vision system 10 shown in FIG. 4, but that example is non-limiting and the processing of FIG. 5 can be implemented in other circuit arrangements.

Further, it will be appreciated that one or more steps or operations shown in the method 500 may be implemented in an order other than that suggested by the figure, or may be performed in parallel, or may be performed on an ongoing basis, e.g., a repeating or looped basis. Indeed, in at least some embodiments, the method 500 is looped or repeated on a per frame basis while the machine vision system 10 is operating in a run state, and is carried out with respect to any number of stereo camera pairs.

With the above possibilities in mind, the method 500 includes obtaining (Block 502) a pair of images comprising a current frame, from first and second cameras 16-1 and 16-2. As before, the cameras 16-1 and 16-2 comprise a stereo camera pair imaging a scene containing one or more RMs 54.

The method 500 further includes estimating (Block 504) mechanical misalignments in and between the first and second cameras 16-1 and 16-2. The estimation processing is based on comparing current reference marker positions to original reference marker positions, where the current reference marker positions are determined from the current frame and the original reference marker positions are known from setup data stored in the machine vision system. For example, the RMs 54 are recognizable in terms of any one or more of color, size, shape, and pattern, and the observed x-y positions of the RMs 54 in the pixel or image data comprising the current frame are compared to original x-y positions of the RMs 54.

The estimation of mechanical misalignments (Block 505) includes the estimation of per-camera misalignments (Block 504A) and/or the estimation (Block 504B) of relative misalignments between the cameras 16-1 and 16-2, which may be referred to as "cross-camera" misalignments. For example, Block 504A includes estimating the imager shift and/or the magnification change for each camera 16-1 and 6-2. Block 504B includes, for example, estimating the relative rotation between the cameras 16-1 and 16-2 and/or the magnification ratio between the cameras 16-1 and 16-2.

The method 500 further includes calculating (Block 506) a worst-case error for stereo vision processing by the machine vision system 10. The worst-case error is calculated as a function of the estimated mechanical misalignments, and the method 500 further includes transitioning (512) the machine vision system 10 from the run state of operation to a fault state of operation, in response to determining that the worst-case error exceeds a defined threshold (NO from Block 508). On the other hand, if the worst-case error is determined to be within defined limits (YES from Block 508), the method 500 includes continuing with run-state operations of the machine vision system 10 (Block 510).

Figure 6:
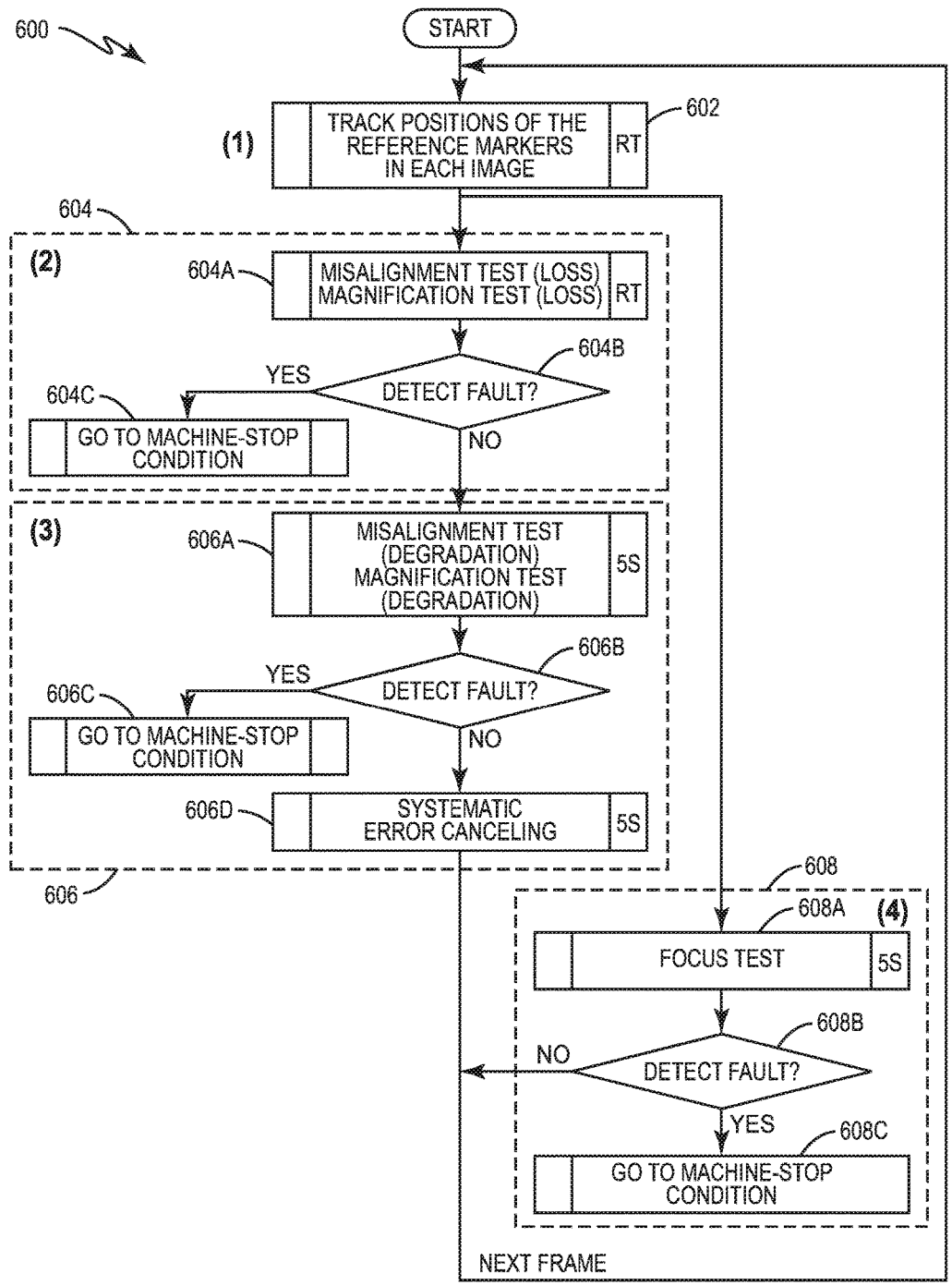
FIG. 6 is a logic flow diagram of another embodiment of a method of detecting mechanical misalignments during run time operation of a machine vision system.

FIG. 6 illustrates another embodiment of detecting and responding to mechanical misalignments in a machine vision system 10. The method 600 can be understood as an extension, or a more detailed version, of the method 500. While not limited to the machine vision system 10 seen in FIG. 4, it will be appreciated that the machine vision system 10 of FIG. 4 is, in one or more embodiments, configured to carry out the method 600. The method 600 repeats on a per frame basis and can be performed serially or in parallel, with respect to each of one or more stereo camera pairs. It should also be appreciated that the method 600 includes processing of current-frame values, as well as processing filtered and/or prior frame values.

At Step 1 (Block 602), the method 600 includes "tracking" the position of the RMs 54 in the current frame. Here, "tracking" denotes the comparison of the observed RM positions to the expected RM positions. The observed RM positions are the positions as detected in the image data comprising the current frame, while the expected RM positions are, for example, the original positions known from an original setup configuration of the machine vision system 10.

RM position tracking may be done using rectified coordinates. Here, it may be noted that each camera 16 has a camera coordinate system, which may be referred to as the "raw" or "distorted" coordinate system, because it includes the effects of lens distortion, etc. Thus, when referring to any given image acquired from any given camera, it will be appreciated that the image may be in the distorted coordinate system, or in a distortion-free coordinate system, or in a rectified coordinate system. An image in the distorted coordinate system may be transformed into the distortion-free coordinate system, based on configuration data expressing the known or characterized distortion of the involved camera lens. Further, an image in the distortion-free coordinate system may be transformed into the rectified coordinate system, which is used to rectify the left and right images in a stereo image pair, so that both images have the same horizontal frame of reference.

Processing continues with Step 2 (Block 604), which also represents per-frame processing with respect to the current frame and includes sub-Blocks 604A, 604B and 604C. Overall, Block 604 represents "loss" testing in which the machine vision system 10 determines whether the worst-case error arising from detected mechanical misalignments exceeds that permitted by the applicable error budget. Here, the term "loss" can be understood as the loss of object detection capability by the machine vision system 10, at least with respect to some specified level of detection performance, such as expressed in minimum object size, distance detection accuracy, etc.

Loss testing is based on detecting mechanical misalignments, including per-camera imager shifts, both perpendicular to and along the optical axis. Loss testing also includes determining the magnification ratio between the cameras—i.e., the mismatch in magnification between the two cameras 16-1 and 16-2—and the relative rotation between the cameras 16-1 and 16-2. These estimates are then used to determine the worst-case error for stereo vision processing by the machine vision system 10, and determine whether the worst-case error exceeds a defined limit (Block 604B).

If so (YES from Block 604B), processing continues to Block 604C, where the machine vision system 10 transitions from the run state of operation to a fault state of operation, which is a "machine stop" condition in the example method. Here, "machine stop" denotes an example scenario where the machine vision system 10 is used to guard or monitor an area or volume around an item of manufacturing equipment or other machine, and to stop the machine responsive to detecting the intrusion of objects within a defined distance or boundary around the machine, and responsive to detecting the loss of detection capability or other faults.

Assuming that the processing of Block 604 follows the "NO" path from Block 604B into Block 606, the method 600 continues with the processing represented by Block 606A, which includes misalignment and magnification tests for "degradations." That is, Block 604 represents testing for the loss of detection capability by the machine vision system 10, e.g., the loss of detection capability with respect to some defined performance requirements, such as a minimum object size, a minimum distance-estimation accuracy, etc. In contrast, Block 606 represents testing for the degradation of detection capability by the machine vision system 10.

These degradations can be understood as causing errors that are within the allowances permitted by the error budget defined for the machine vision system 10. Here, the "error budget" includes a number of constituent errors that each arises from a different component or operation in the image acquisition and processing flow of the machine vision system 10. It will be understood that the mechanical misalignments at issue herein all contribute to constituent errors within the error budget.

Further, while the loss testing at issue in Block 604 operates on per-frame values, i.e., on the mechanical misalignments and resulting worst-case error calculations, as based on the RM positions observed in the current frame, the degradation testing at issue in Block 606 operates using filtered values, or otherwise uses values from the current frame and one or more previous frames. Here, "values" is used generically to refer to any one or more of: tracked RM positions, detected mechanical misalignments, estimated worst-case errors, and any intermediate values used in such calculations.

While Block 604 detects and reacts to detection loss within the defined response time (RT) of the machine vision system 10, the testing of Block 606 generally plays out over a longer duration, such as the five seconds (5S) denoted in the diagram, as a non-limiting example. Here, the "response time" of the machine vision system 10 is a defined reaction time that it must exhibit between detecting the intrusion of an object into a hazardous area and/or detecting the loss of detection capability, and the shutting down of an associated, guarded machine.

In one example implementation of Block 606, the machine vision system 10 compares (Block 606A) the worst-case error computed for the current frame with the worst-case error computed for a prior frame, e.g., a frame from some number of seconds in the past. If the difference between the two worst-case errors exceeds a defined threshold (YES from Block 606B), the machine vision system 10 transitions from the run state of operation to a fault state of operation. This processing can be understood as detecting and responding to gradually increasing errors.

On the other hand, if there is no fault (NO from Block 606B), processing continues with systematic error canceling in Block 606D. Systematic error canceling adapts one or more parameters used by the machine vision system 10 in its stereo vision processing. For example, to determine the distance to an object present in the FOV 50, the machine vision system 10 determines the stereo disparity between the object as viewed from the camera 16-1 and from the camera 16-2. Here, the "stereo disparity" is difference in position between corresponding points in the two images. At the initial setup of the machine vision system 10, the stereo disparity depends on the actual separation between the two cameras 16—the "baseline"—and their relative angles or positioning. Broadly, the configuration data accurately captures or accounts for the initial, overall camera alignments.

The calibration parameters determined or loaded at setup are then used by the machine vision system 10 during its subsequent, run-state machine vision processing, e.g., in rectifying images in a stereo pair and when calculating stereo disparity. Critically, however, the calibration parameters become inaccurate as mechanical misalignments arise during subsequent operation of the machine vision system 10.

Thus, in Block 606D, the machine vision system 10 updates one or more of its calibration parameters responsive to detecting mechanical misalignments relative to the setup conditions. For example, the machine vision system 10 maintains or updates a parameter that reflects the relative rotation angle between the cameras—e.g., in degrees—and uses the detected relative rotation angle, to compensate image rectification. Here, image "rectification" can be understood as making the left and right images from a stereo camera pair coplanar with respect to the baseline between the cameras, i.e., all epipolar lines are parallel to the horizontal axis established by the baseline between the cameras 16.

By continuously or repeatedly estimating the relative rotation angle between the cameras 16-1 and 16-2, the machine vision system 10 can maintain an updated value for the calibration parameter(s) that express or are related to the relative rotation angle. The same is true for magnification ratios and the mismatch in magnification between the cameras. Moreover, x-y offset values, which may be expressed in image coordinates or pixel row-column values, for example, may be maintained in the configuration data 30 and/or 42, to capture detected imager shifts, and such values may be used to compensate stereo disparity calculations, etc.

Notably, the machine vision system 10 in one or more embodiments uses filtering in its systematic error cancellation processing. That is, rather than updating calibration parameters based on the values associated with one frame, which values may be noisy, the machine vision system 10 may use filtered values. For example, the machine vision system 10 uses filtered RM positions—e.g., as observed over some number of frames, say, 100 frames—to compute mechanical misalignments and bases its calibration parameter updates on those misalignments. Alternatively, rather than filtering the observed RM positions, the machine vision system 10 filters the mechanical misalignments across some number of frames, and bases its calibration parameter updates on the filtered mechanical misalignments.

One also sees that FIG. 6 includes a focus test in Block 608, which includes Blocks 608A, 608B and 608C. In Block 608A, the machine vision system 10 performs a focus test. If the focus test fails (YES from Block 608B), processing continues with the machine vision system 10 transitioning from the run state of operation to a fault state of operation. If the focus test passes (NO from Block 608B), processing continues in the run state of operation. Block 608 may be performed over a time frame like that used for Block 606, i.e., more slowly than the base response time requirement of the machine vision system 10, and it may use filtered values for such testing, and/or may require a certain number of failures before throwing a fault.

In one example of focus testing, it shall be understood that the RMs 54 have one or more visual attributes that facilitate focus testing, such as color, shape, patterning, contrast with the background scene, etc. Correspondingly, to detect out of focus conditions, the machine vision system 10 in one or more embodiments: (1) calculates the amount of high-frequency image components observed in the image data corresponding to each RM 54, which RMs may be strategically placed in the scene so as to appear at or near the image corners; and (2) estimates the degree of the worst blur effect in the image. If that degree is beyond the level defined as tolerable, the machine vision system 10 transitions from the run state into the machine-stop or other specified fault condition.

Further, to relax requirements for RM placement within the scene being imaged, the machine vision system 10 in one or more embodiments: (1) stores information characterizing the defocus distribution of the involved camera lenses (known by design or as factory-characterized); and (2) estimates the worst defocus level from an actual defocus level measured at some RM location within an image. That is, the machine vision system 10 may use the focus profile of the involved lenses to evaluate the focus quality in dependence on where in the image the focus is being evaluated.

Figure 7:
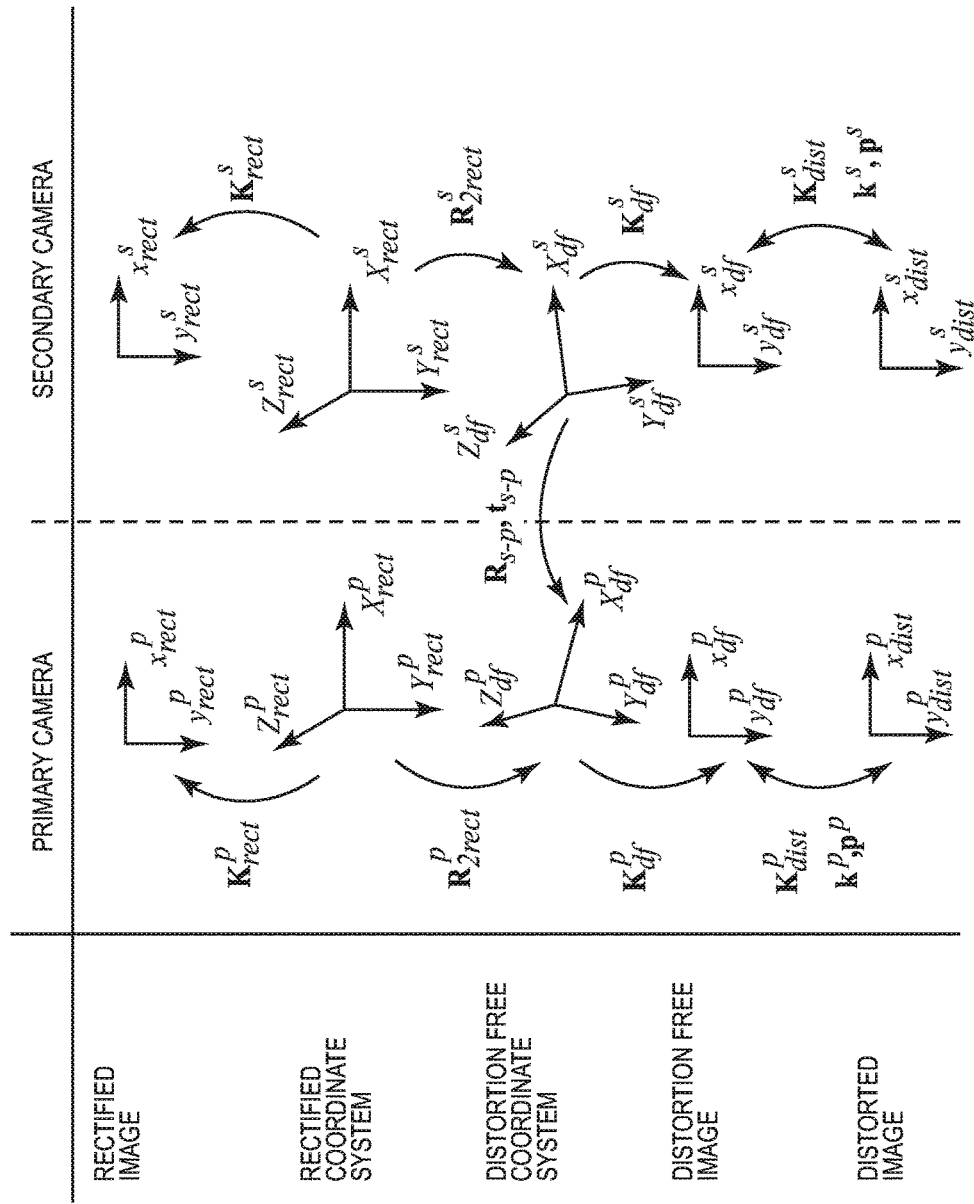
FIG. 7 is a diagram illustrating example relationships between different coordinate systems applicable to a frame or stereo image pair, from a stereo camera pair.

To better understand the above processing in a more detailed fashion and in the context of one or more example embodiments, consider FIG. 7. For a first or primary one of the cameras 16 in a stereo pair, the diagram depicts a rectified coordinate system $K_{rect}^p$ and a corresponding notation $\{x_{rect}^p, y_{rect}^p\}$ for the x-y dimensions of a rectified image. The diagram further depicts a distortion-free coordinate system $K_{df}^p$ and a corresponding notation $\{x_{df}^p, y_{df}^p\}$ for the x-y dimensions of a distortion-free image, for the primary camera. Still further, the diagram depicts a distorted or raw image coordinate system $K_{dist}^p$ and a corresponding notation $\{x_{dist}^p, y_{dist}^p\}$ for the x-y dimensions of a distorted image. Corresponding coordinate system and dimensional expressions are given for the second or secondary one among the pair of cameras 16, where these terms are superscripted with "s" for "secondary" rather than "p" for "primary."

Images provided by the involved cameras 16 are initially in the distorted coordinate systems of those cameras 16. For object detection and other processing, the machine vision system 10 transforms the images from the distorted coordinate systems into the corresponding distortion-free coordinate systems, and then from the distortion-free coordinate systems into the rectified coordinate systems.

When referring to "images" in the context of this disclosure, the images may be in any of the above coordinate systems and/or some operations may be performed on the images in one coordinate system, while other operations are performed on the same images, but after transforming them to another coordinate system. Thus, a given image output in the current frame from a given camera 16 may be referred to as a raw or distorted image, or as a distortion-free image, or as a rectified image, all in dependence on which coordinate system is applicable at that particular time or at that particular point in the vision processing flow.

For example, in one or more embodiments contemplated herein, the machine vision system 10 tracks RM positions using rectified images, but uses distortion-free images to estimate the relative rotation between cameras 16 in a stereo camera pair. Thus, when processing the pair of images constituting a current frame as output by a stereo pair of cameras 16-1 and 16-2, the machine vision system 10 transforms that pair of images into their respective distortion-free coordinate systems and uses the distortion-free images to estimate the relative rotation between the cameras 16-1 and 16-2. However, the machine vision system 10 determines the apparent movement of shifting of the RM positions within the image from each camera 16-1 and 16-2, using the rectified coordinate systems.

The transformations between the coordinate systems is based on the aforementioned configuration data 30 and/or 42, which includes the calibration parameters described above, including those parameters used for image rectification. Consequently, RM positions in a rectified image can be transformed to a distortion-free coordinate system, and to a distorted-image coordinate system, according to the applicable relationships.

In more detail, the relationship between the 3D camera coordinates and the image coordinates K is an intrinsic camera matrix and can be defined as $$K = \begin{pmatrix} f & 0 & pp_x \\ 0 & f & pp_y \\ 0 & 0 & 1 \end{pmatrix}.$$

Here, f is focal length [pixel], $pp=(pp_x, pp_y)$[pixel] is a principal point of the camera 16. Each image coordinate has its own K. A 3D position in a coordinate system $X=(X\ Y\ Z)^T$ is projected into an image coordinate $x=(x\ y)^t$ with K as follows. This conversion uses the pinhole camera model.

$$\hat{x} = K\frac{X}{Z} = (x\ y\ 1)^T = (x^T\ 1)^T$$

For each of the cameras 16, the relationship between the rectified coordinate system and the distortion-free coordinate system is expressed with a rotation matrix R that imparts a relative rotation between the coordinate systems. Further, to project or translate from the distortion free coordinate system of the primary camera 16-1 to the distortion free coordinate system of the secondary camera 16-2, one may use a translation vector t. Here, the vector t represents the shift between the origin of the distortion-free coordinate system of the primary camera 16-1 and the origin of the distortion-free coordinate system of the secondary camera 16-2. Thus, 3D coordinates can be transformed between the distortion-free coordinate systems of the two cameras 16-1 and 16-2 using these two parameters as follows:

$$X_b = RX_a + t$$

As for the relationship between a distortion-free coordinate and a rectified coordinate, only relative rotation is defined because the rectified coordinate is a virtual coordinate that makes images belonging to a stereo camera pair parallel to each other. As for the relationship between distortion-free images and distorted images, that relationship is expressed by the applicable lens distortion model and distortion coefficients k and p. The coefficient $k=(k_1\ k_2\ k_3)$ corresponds to radial distortion. The coefficient $p=(p_1\ p_2)$ corresponds to tangential distortion.

Consequently, a distortion-free image coordinate $x_{df}=(x_{df}\ y_{df})^T$ can be converted to a distorted image coordinate $x_{dist}=(x_{dist}\ y_{dist})^T$ as follows:

$$\hat{x}_{df}=(x_{df}^T 1)^T$$

$$\hat{x}_{df\_norm}=K_{df}^{-1}\hat{x}_{df}=(x_{df\_norm}\ y_{df\_norm}\ 1)^T$$

$$\hat{x}_{dist\_norm}=(u,v,1)^T$$

$$u=(1+k_1r^2+k_2r^4+k_3r^6)x_{df\_norm}+2p_1x_{df\_norm}y_{df\_norm}+p_2(r^2+2x_{df\_norm}^2)$$

$$v=(1+k_1r^2+k_2r^4+k_3r^6)y_{df\_norm}+2p_2x_{df\_norm}y_{df\_norm}+p_1(r^2+2y_{df\_norm}^2)$$

$$r=\sqrt{x_{df\_norm}^2+y_{df\_norm}^2}$$

$$\hat{x}_{dist}=K_{dist}\hat{x}_{dist\_norm}=(x_{dist}\ y_{dist}\ 1)^T=(x_{dist}^T\ 1)^T$$

Figure 8:
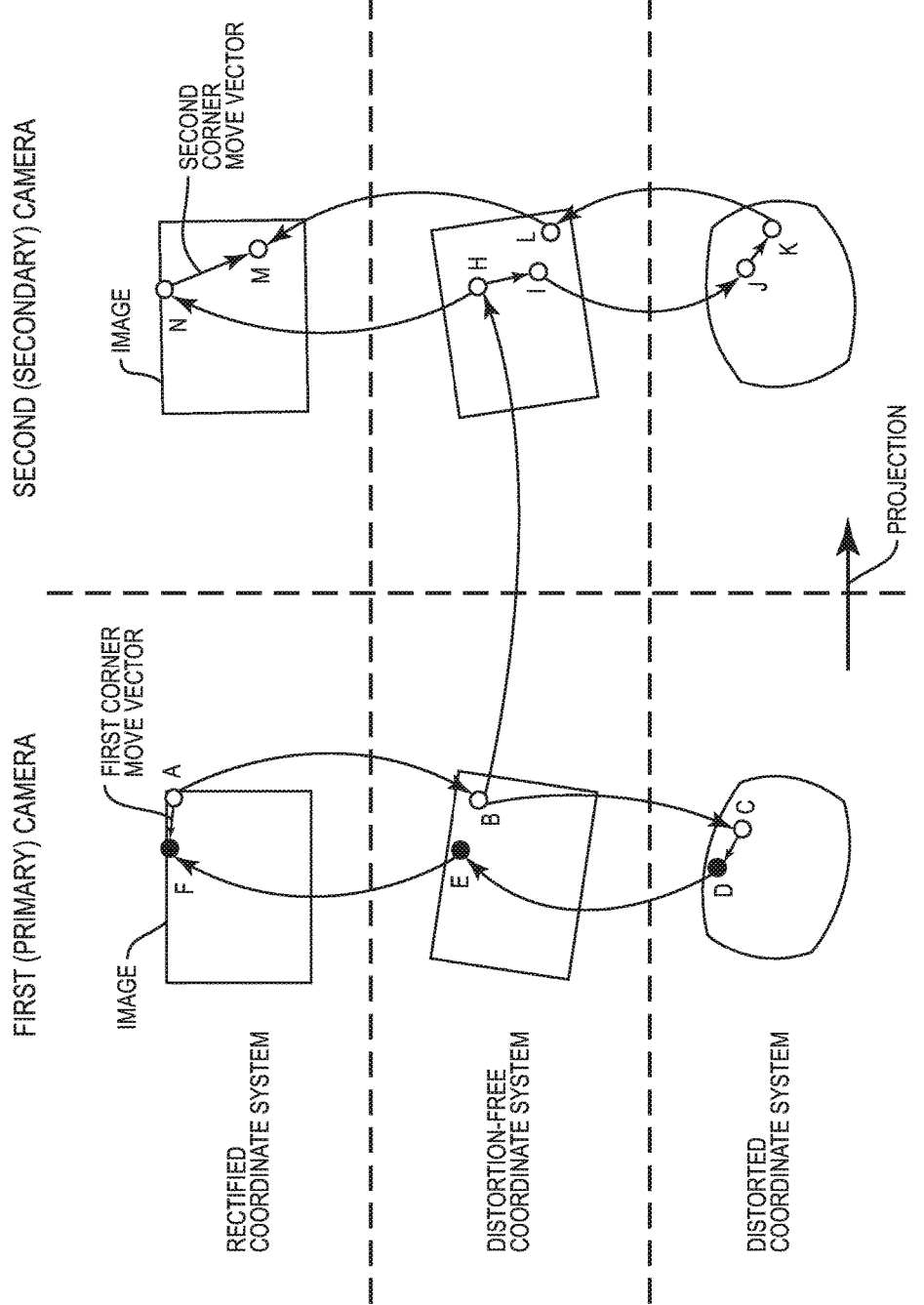
FIG. 8 is a diagram illustrating an example of corner position determinations, as used to estimate a worst-case error for stereo vision processing.

When a mechanical shift occurs in or between the cameras 16-1 and 16-2, such as seen in the example of FIG. 4, it can be assumed to map to a change in one or more calibration parameters used by the machine vision system 10. Correspondingly, FIG. 8 illustrates an example approach to determining the worst-case error for stereo vision processing by the machine vision system 10, based on using "corner move vectors."

Firstly, the machine vision system 10 obtains a frame from a stereo camera pair 16-1 and 16-2, i.e., a pair of images comprising left and right or primary and secondary images. The machine vision system 10 transforms those images into the rectified coordinate systems of the involved cameras 16-1 and 16-2, determines the difference between the observed RM positions in the rectified images with respect to their original positions from setup, and uses those differences to determine per-camera misalignments, including the perpendicular shift or offset of the imager 20 relative to the optical axis of the camera 16 and the magnification ratio of the camera 16. These detections may be determined or expressed in relation to the corresponding parameters known or determined at setup.

The machine vision system 10 determines the relative magnification ratio between the cameras 16-1 and 16-2, based on the per-camera magnification determinations, and further determines the relative rotation between the cameras 16-1 and 16-2. Here, the estimation of relative rotation is based on the machine vision system 10 transforming the observed RM positions from the rectified coordinate systems into the corresponding distortion-free coordinate systems. The machine vision system 10 uses these estimations of mechanical misalignment, i.e., the per camera shifts, and the cross-camera magnification ratio and relative rotation, as determined from its RM position tracking, to estimate the worst-case error for stereo vision processing by the machine vision system 10.

In particular, the machine vision system 10 in one or more embodiments uses "corner move vectors" to estimate the worst-case error, because stereo disparity errors are expected to at their worst for image corners. In looking at the primary camera column in FIG. 8, the corner-move vector processing begins with "Point A," which is a corner position in the rectified coordinate system. The machine vision system 10 transforms Point A from the rectified coordinate system into "Point B" in the distortion-free coordinate system of the primary camera 16, and transforms Point B into "Point C" in the distorted coordinate system of the primary camera 16.

The machine vision system 10 then applies the per-camera misalignments determined for the primary camera 16 to Point C, which has the effect of shifting Point C to "Point D" in the distorted coordinate system. From there, the machine vision system 10 transforms Point D back into the distortion-free coordinate system, as "Point E," and transforms Point E into the rectified coordinate system as "Point F."

The machine vision system 10 then computes a first corner move vector, based on the x-y position differences between Point A and Point F, in the rectified coordinate system of the primary camera 16. Point A may be expressed as $x^p_{corner\_rect}$, and Point F may be expressed as $x^p_{corner\_rect\_add}$. Thus, the first corner move vector may be expressed as $$v^p_{corner\_rect\_add} = x^p_{corner\_rect\_add} - x^p_{corner\_rect}.$$

The machine vision system 10 also computes a second corner move vector, which takes account not only of the per-camera misalignments of the secondary camera 16, but also the relative rotation between the primary and secondary cameras 16. First, the machine vision system 10 projects Point B from the distortion-free coordinate system of the primary camera 16 into the distortion-free coordinate system of the secondary camera 16, to obtain "Point H." Point B may be expressed as $x^p_{corner\_df}$, and Point H may be expressed as $x^{s\_p}_{corner\_df}$, and it will be understood that $x^{s\_p}_{corner\_df}$ is obtained by applying the $X_b = RX_a + t$ transform explained above, as adjusted for the relative rotation determined by the machine vision system 10 based on its evaluation of the observed RM positions.

The machine vision system 10 then shifts Point H within the distortion-free coordinate system of the secondary camera 16 to obtain "Point I." In particular, Point H is shifted according to the detected relative rotation between the primary and secondary cameras 16. The machine vision system 10 then transforms Point I into "Point J" in the distorted coordinate system of the second camera 16. The machine vision system 10 then shifts Point J to "Point K" in the distorted coordinate system, where the shifting is calculated as a function of the per-camera misalignments determined by the machine vision system 10 for the secondary camera 16. Processing continues with the machine vision system 10 transforming Point K into the distortion-free coordinate system of the secondary camera 16, to obtain "Point L." Point L is then transformed into the rectified coordinate system of the secondary camera 16, to obtain "Point M." The machine vision system 10 further obtains "Point N" in the rectified coordinate system of the secondary camera 16, based on transforming Point H from the distortion-free coordinate system of the secondary camera 16 into the rectified coordinate system of the secondary camera 16.

Point N does not account for the relative rotation between the primary and secondary cameras 16, and instead accounts for the corresponding corner "move" without any mechanical misalignments. Point M, however, accounts for both the relative rotation between the primary and secondary cameras 16, and the per-camera misalignments of the secondary camera 16. The second move vector is calculated as the difference in x-y positions of Points M and N. If one represents Point M as $x^{s\_p}_{corner\_rect\_opt\_add}$ and point N as $x^{s\_p}_{corner\_rect}$, then the second corner move vector may be expressed as $$v^{s\_p}_{corner\_rect\_opt\_add} = x^{s\_p}_{corner\_rect\_opt\_add} - x^{s\_p}_{corner\_rect}.$$

Thus, the epipolar error and disparity for the misalignments existent at setup of the machine vision system 10 can be expressed as $$d_{setup} = x^p_{corner\_rect} - x^{s\_p}_{corner\_rect},$$

where $x^p_{corner\_rect}$ is Point A in FIG. 8, and $x^{s\_p}_{corner\_rect}$ is Point N in FIG. 8, as computed during setup conditions. Changes in the extent or nature of these misalignments during runtime operation of the machine vision system 10 changes the epipolar error and disparity. Thus, the epipolar error and disparity for any point during runtime operation of the machine vision system 10 can be expressed as $$d_{runtime} = x^p_{corner\_rect\_add} - x^{s\_p}_{corner\_rect\_opt\_add},$$

where $x^p_{corner\_rect\_add}$ is Point F in FIG. 8, and $x^{s\_p}_{corner\_rect\_opt\_add}$ is Point M in FIG. 8.

The worst-case error for stereo vision processing by the machine vision system 10 during runtime operation can therefore be understood as the change or difference in epipolar error and disparity, relative to the setup conditions of the machine vision system 10. Viewed in these terms, the worst-case error may be expressed as $$err_{worst} = d_{runtime} - d_{setup}.$$

By simple substitution, one sees that $err_{worst}$ is the difference between the first corner move vector and the second corner move vector, i.e., $$err_{worst} = x^{s\_p}_{corner\_rect\_opt\_add} - x^{s\_p}_{corner_{rect}} - \left(x^p_{corner_{rect_{add}}} - x^p_{corner_{rect}}\right).$$

Figure 5:
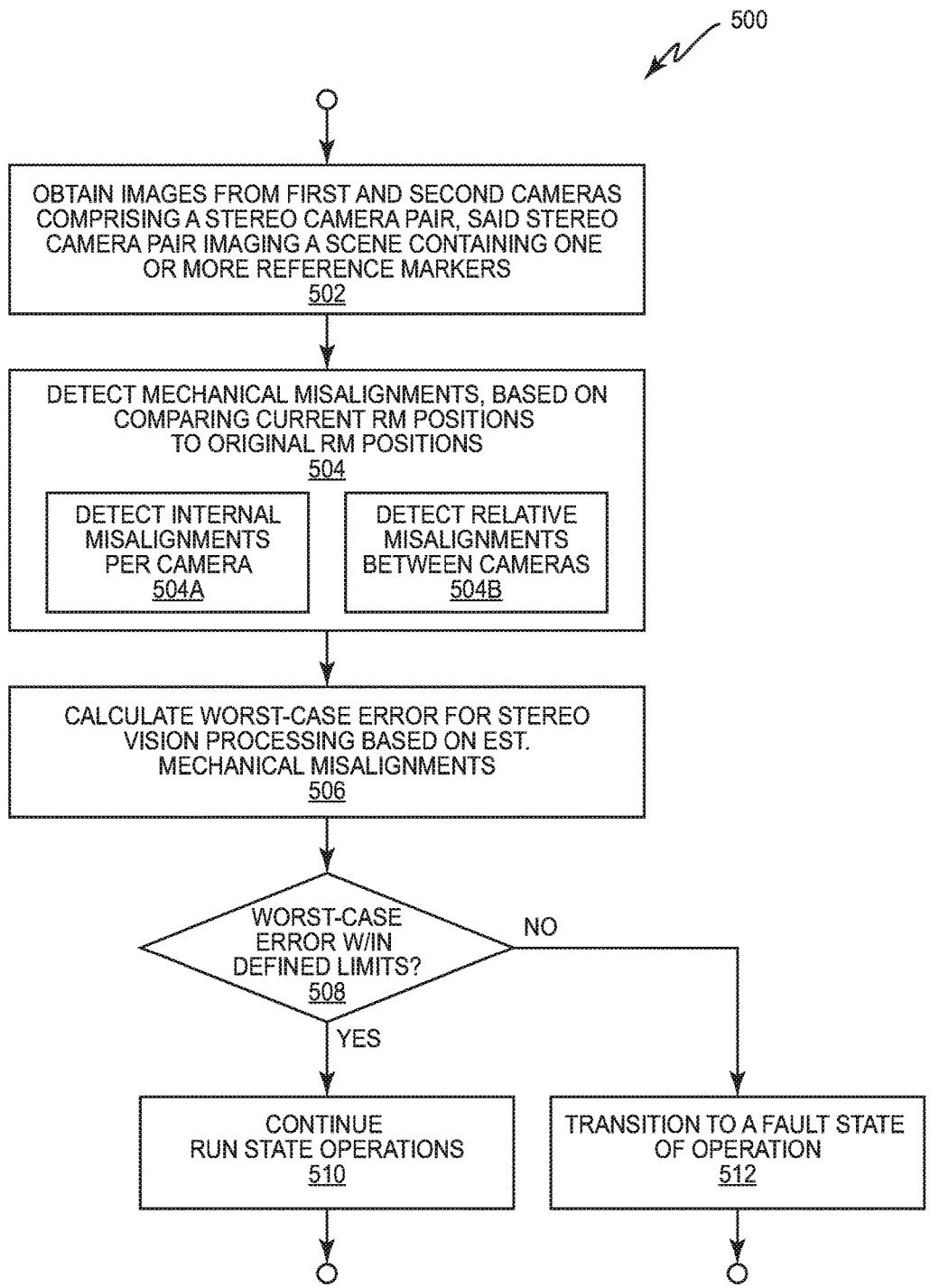
FIG. 5 is a logic flow diagram of one embodiment of a method of detecting mechanical misalignments during run time operation of a machine vision system.

Thus, with respect to the per frame processing at issue in Block 508 of FIG. 5 and/or with respect to the per frame processing of Block 604 in FIG. 6, it will be understood that in one or more embodiments, the machine vision system 10 determines the mechanical misalignments, where the phrase "mechanical misalignments" here is meant to broadly encompass the per camera and cross camera (between camera) misalignments and differences described herein, and then uses those determined mechanical misalignments to compute the first and second corner move vectors, and then uses those corner move vectors to compute the worst-case error.

However, this per frame error determination is, in one or more embodiments, configured to operate on frame-to-frame variations. For example, one may use "t-n" to denote a previous frame having "valid" determinations of mechanical misalignments, and use "t" to denote the current frame. Then, assuming that the mechanical misalignment determinations for the current frame are also valid, the determination as to whether the worst-case error for the current frame is or is not within permissible limits can be performed as a frame-to-frame variation determination expressed as $$\text{variation}=err_{worst_t}-err_{worst\_t-n},$$

where n, for example, equals 1 if the immediately prior frame was valid, or equals 2 if the frame before that was valid, and so on.

Thus, the YES/NO decision in Block 508 and/or the YES/NO decision in Block 604B is, in some embodiments, made as a function of determining whether the frame-to-frame variation in the worst-case error is within a defined limit. Several further comments are applicable to this approach to fault detection.

Firstly, fault detection based on tracking frame-to-frame variations does not in and of itself account for slowly changing misalignments. Thus, the fault detection in Block 606B of FIG. 6 can, for example, perform the same type of variation assessment, but may compare the worst-case error for the current frame to the worst-case error from a frame further in the past, e.g., from three seconds ago. Of course, the worst-case error value may be calculated in Block 606B using filtering, but, nonetheless, by comparing the worst-case error determined in the current frame with the worst-case error determined earlier, e.g., 90 or 100 frames earlier, the machine vision system 10 also detects and responds to gradually changing misalignments.

Second, in the above explanation of determining frame-to-frame variations, it was noted that "valid" frames are used. A frame may be considered valid if the mechanical misalignment determinations made for that frame are within defined limits, and those limits may be defined as deltas or allowed offsets that can be used to determine whether the mechanical misalignments determined in any given frame are too large or represent so great a change, as to be considered inaccurate for use by the machine vision system 10.

With the above in mind, in one or more embodiments and with reference to the point labels seen in FIG. 8, the processing circuitry 24 and/or 36 is configured to calculate a first corner move vector as a function of the imager shift and the magnification change of the first camera 16-1 in a stereo pair of cameras 16-1 and 16-2, calculate a second corner move vector as a function of the imager shift and the magnification change of the second camera 16-2, and further as a function of the relative rotation and the magnification ratio between the first and second cameras 16-1 and 16-2, determine a difference between the first and second corner move vectors, and compare the difference to a reference difference corresponding to original first and second corner move vectors known from the setup data—e.g., the $d_{runtime}$–$d_{setup}$ determination explained above.

The above processing is based on the processing circuitry 24 and/or 36 calculating the first corner move vector based on being configured to obtain a transformed corner position (Point F), by transforming an original image corner position (Point A) for the first camera 16-1, from a rectified coordinate system into a distortion-free coordinate system of the first camera 16-1 (Point B), and from the distortion-free coordinate system into a distorted coordinate system of the first camera 16-1 (Point C). Here, the distorted coordinate system of the first camera 16-1 is a raw coordinate system for the first camera 16-1 that reflects lens distortion of the first camera 16-1.

The processing circuitry 24 and/or 36 is further configured to compute a moved corner position (Point D) for the first camera 16-1 as a function of the transformed corner position (Point C) and the estimated mechanical misalignments for the first camera 16-1, and to obtain a transformed moved corner position (Point F) for the first camera 16-1, by transforming the moved corner position (Point D) from the distorted coordinate system of the first camera 16-1 back into the rectified coordinate system (i.e., to Point E and then to Point F). From there, the processing circuitry 24 and/or 36 is configured to compute the first corner move vector as the difference between the transformed moved corner position (Point F) and the original image corner position (Point A).

Further, the processing circuitry 24 and/or 36 is configured to calculate the second corner move vector based on being configured to obtain a projected corner position (Point H) by obtaining a transformed corner position (Point B), based on transforming an original image corner position for the first camera 16-1 (Point A) from a rectified coordinate system of the first camera 16-1 into a distortion-free coordinate system of the first camera 16-1, and projecting the transformed corner position (Point B) into a distortion-free coordinate system of the second camera 16-2.

The processing circuitry 24 and/or 36 then obtains a second transformed corner position (Point N) by transforming the projected corner position into a rectified coordinate system of the second camera 16-2, and obtains a third transformed corner position (Point I) by shifting the projected corner position (Point H) as a function of the relative rotation between the first and second cameras 16-1 and 16-2, and transforming, after said shifting, the projected corner position (Point I) into a distorted coordinate system of the second camera 16-2 (Point J).

The processing circuitry 24 and/or 36 then shifts the third transformed corner position (Point J) within the distorted coordinate system as a function of the estimated imager shift and the estimated magnification change as estimated for the second camera (which yields Point K), and then obtains a fourth transformed corner position (Point M) by transforming the third transformed corner position, after said shifting in the distorted coordinate system of the second camera (Point K), into the distortion-free coordinate system of the second camera 16-2 (Point L) and then into the rectified coordinate system of the second camera 16-2 (Point M). The processing circuitry 24 and/or 36 then computes the second corner move vector as the difference between the second transformed corner position (Point N) and the fourth transformed corner position (Point M).

Also, as noted, the processing circuitry 24 and/or 36 is, in one more embodiments, configured to evaluate the current frame, or some number of frames, to detect blurring of the RMs 54 and transition the machine vision system 10 from the run state of operation to a fault state of operation, in response to detecting a level of blurring that exceeds a defined threshold. Blurring may result from lens deterioration and/or homogeneous contamination, such as dust, oil, etc. In at least one such embodiment, the processing circuitry 24 and/or 36 is configured to adapt the defined blurring threshold as a function of a position of the RM 54 within the involved image or images and a corresponding focus quality profile known for the lenses 18 of the first and second cameras 16-1 and 16-2.

Still further, the machine vision system 10 may be configured to require that a certain number of RMs 54 be present in the scene imaged by the stereo pair of cameras 16-1 and 16-2. In such embodiments, the processing circuitry 24 and/or 36 is configured to evaluate the image data, e.g., in each frame, determine whether the minimum required number of RMs 54 is visible, and, if not, transition from the run state of operation to a fault state of operation.

Notably, modifications and other embodiments of the disclosed invention(s) will come to mind to one skilled in the art having the benefit of the teachings presented in the foregoing descriptions and the associated drawings. For example, the teachings herein are applicable to any number of stereo camera pairs, and to the use of more than two cameras, e.g., where misalignments in and between three, four, or more cameras having overlapping fields of view are used for 3D ranging and object detection.

Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation in a machine vision system operating in a run state, said method comprising:
   obtaining a pair of images comprising a current frame, from first and second cameras comprising a stereo camera pair, said stereo camera pair imaging a scene containing one or more reference markers;
   estimating mechanical misalignments in and/or between the first and second cameras, based on comparing current reference marker positions to original reference marker positions, wherein the current reference marker positions are determined from the current frame and the original reference marker positions are known from setup data stored in the machine vision system;
   calculating a worst-case error for stereo vision processing by the machine vision system, as a function of the estimated mechanical misalignments;
   transitioning the machine vision system from the run state of operation to a fault state of operation, in response to determining that the worst-case error exceeds a defined threshold; and
   obtaining filtered estimations of the mechanical misalignments over some number of frames from the first and second cameras, obtaining a filtered worst-case error from the filtered estimations, and transitioning the machine vision system from the run state of operation to a fault state of operation if the filtered worst-case error exceeds a defined threshold.

2. The method of claim 1, wherein obtaining the filtered estimations of the mechanical misalignments over some number of frames comprises one of:
   obtaining filtered reference marker positions over some number of frames and obtaining the filtered estimations of the mechanical misalignments by calculating the mechanical misalignments in and between the first and second cameras from the filtered reference marker positions; and
   filtering the estimated mechanical misalignments, as estimated in each of said number of frames, to obtain the filtered mechanical misalignments.

3. A method of operation in a machine vision system operating in a run state, said method comprising:
   obtaining a pair of images comprising a current frame, from first and second cameras comprising a stereo camera pair, said stereo camera pair imaging a scene containing one or more reference markers;
   estimating mechanical misalignments in and/or between the first and second cameras, based on comparing current reference marker positions to original reference marker positions, wherein the current reference marker positions are determined from the current frame and the original reference marker positions are known from setup data stored in the machine vision system;
   calculating a worst-case error for stereo vision processing by the machine vision system, as a function of the estimated mechanical misalignments; and
   transitioning the machine vision system from the run state of operation to a fault state of operation, in response to determining that the worst-case error exceeds a defined threshold;
   wherein estimating the mechanical misalignments comprises estimating at least one of: a per-camera imager shift, a per-camera magnification change, a relative rotation between the cameras, and a magnification ratio between the cameras; and
   wherein estimating the relative rotation and the magnification ratio comprises:
      obtaining one or more projected positions, by projecting one or more reference marker positions as observed in the image from the first camera, into a coordinate system of the second camera; and
      comparing the projected positions to corresponding reference marker positions as observed in the image from the second camera.

4. A method of operation in a machine vision system operating in a run state, said method comprising:
   obtaining a pair of images comprising a current frame, from first and second cameras comprising a stereo camera pair, said stereo camera pair imaging a scene containing one or more reference markers;
   estimating mechanical misalignments in and/or between the first and second cameras, based on comparing current reference marker positions to original reference marker positions, wherein the current reference marker positions are determined from the current frame and the original reference marker positions are known from setup data stored in the machine vision system;
   calculating a worst-case error for stereo vision processing by the machine vision system, as a function of the estimated mechanical misalignments; and
   transitioning the machine vision system from the run state of operation to a fault state of operation, in response to determining that the worst-case error exceeds a defined threshold;
   wherein estimating the mechanical misalignments comprises estimating at least one of: a per-camera imager shift, a per-camera magnification change, a relative rotation between the cameras, and a magnification ratio between the cameras; and
   wherein estimating the worst-case error comprises:
      calculating a first corner move vector as a function of the imager shift and the magnification change of the first camera;
      calculating a second corner move vector as a function of the imager shift and the magnification change of the second camera, and further as a function of the relative rotation between the first and second cameras;
      determining a difference between the first and second corner move vectors; and
      comparing the difference to a reference difference corresponding to original first and second corner move vectors known from the setup data.

5. The method of claim 4, wherein calculating the first corner move vector comprises:

obtaining a transformed corner position, by transforming an original image corner position for the first camera from a rectified coordinate system into a distortion-free coordinate system of the first camera, and from the distortion-free coordinate system into a distorted coordinate system of the first camera, the distorted coordinate system of the first camera being a raw coordinate system for the first camera that reflects lens distortion of the first camera;

computing a moved corner position for the first camera as a function of the transformed corner position and the estimated mechanical misalignments for the first camera;

obtaining a transformed moved corner position for the first camera, by transforming the moved corner position from the distorted coordinate system of the first camera back into the rectified coordinate system; and computing the first corner move vector as the difference between the transformed moved corner position and the original image corner position.

6. The method of claim 4, wherein calculating the second corner move vector comprises:

obtaining a projected corner position by obtaining a transformed corner position, based on transforming an original image corner position for the first camera from a rectified coordinate system of the first camera into a distortion-free coordinate system of the first camera, and projecting the transformed corner position into a distortion-free coordinate system of the second camera;

obtaining a second transformed corner position by transforming the projected corner position into a rectified coordinate system of the second camera;

obtaining a third transformed corner position by shifting the projected corner position as a function of the relative rotation between the first and second cameras, and transforming, after said shifting, the projected corner position into a distorted coordinate system of the second camera, shifting the third transformed corner position within the distorted coordinate system as a function of the estimated imager shift and the estimated magnification change as estimated for the second camera;

obtaining a fourth transformed corner position by transforming the third transformed corner position, after said shifting in the distorted coordinate system of the second camera, into the distortion-free coordinate system of the second camera and then into the rectified coordinate system of the second camera; and computing the second corner move vector as the difference between the second transformed corner position and the fourth transformed corner position.

7. A method of operation in a machine vision system operating in a run state, said method comprising:

obtaining a pair of images comprising a current frame, from first and second cameras comprising a stereo camera pair, said stereo camera pair imaging a scene containing one or more reference markers;

estimating mechanical misalignments in and/or between the first and second cameras, based on comparing current reference marker positions to original reference marker positions, wherein the current reference marker positions are determined from the current frame and the original reference marker positions are known from setup data stored in the machine vision system;

calculating a worst-case error for stereo vision processing by the machine vision system, as a function of the estimated mechanical misalignments; and transitioning the machine vision system from the run state of operation to a fault state of operation, in response to determining that the worst-case error exceeds a defined threshold; and wherein the method further comprises:

evaluating the current frame, or some number of frames, to detect blurring of the reference markers and transitioning the machine vision system from the run state of operation to a fault state of operation, in response to detecting a level of blurring that exceeds a defined threshold; and with respect to a given reference marker, adapting the defined threshold as a function of a position of the reference marker within the involved image or images and a corresponding focus quality profile known for the lenses of the first and second camera.

8. A machine vision system comprising:

interface circuitry configured to obtain a pair of images comprising a current frame from first and second cameras comprising a stereo camera pair, said stereo camera pair imaging a scene containing one or more reference markers; and processing circuitry operatively associated with the interface circuitry and, during run state operation of the machine vision system, configured to:

estimate mechanical misalignments in and/or between the first and second cameras, based on comparing current reference marker positions to original reference marker positions, wherein the current reference marker positions are determined from the current frame and the original reference marker positions are known from setup data stored in the machine vision system;

calculate a worst-case error for stereo vision processing by the machine vision system, as a function of the estimated mechanical misalignments; and transition the machine vision system from the run state of operation to a fault state of operation, in response to determining that the worst-case error exceeds a defined threshold; and wherein the processing circuitry is configured to obtain filtered estimations of the mechanical misalignments over some number of frames from the first and second cameras, obtain a filtered worst-case error from the filtered estimations, and transition the machine vision system from the run state of operation to a fault state of operation if the filtered worst-case error exceeds a defined threshold.

9. The machine vision system of claim 8, wherein the processing circuitry is configured to obtain the filtered estimations of the mechanical misalignments over some number of frames, based on being configured to:

obtain filtered reference marker positions over some number of frames and obtain the filtered estimations of the mechanical misalignments by calculating the mechanical misalignments in and between the first and second cameras from the filtered reference marker positions; or filter the estimated mechanical misalignments, as estimated in each of said number of frames, to obtain the filtered mechanical misalignments.

10. A machine vision system comprising:

interface circuitry configured to obtain a pair of images comprising a current frame from first and second cameras comprising a stereo camera pair, said stereo camera pair imaging a scene containing one or more reference markers; and processing circuitry operatively associated with the interface circuitry and, during run state operation of the machine vision system, configured to:
  estimate mechanical misalignments in and/or between the first and second cameras, based on comparing current reference marker positions to original reference marker positions, wherein the current reference marker positions are determined from the current frame and the original reference marker positions are known from setup data stored in the machine vision system;
  calculate a worst-case error for stereo vision processing by the machine vision system, as a function of the estimated mechanical misalignments; and
  transition the machine vision system from the run state of operation to a fault state of operation, in response to determining that the worst-case error exceeds a defined threshold;
wherein the processing circuitry is configured to estimate the mechanical misalignments based on being configured to estimate at least one of: a per-camera imager shift, a per-camera magnification change, a relative rotation between the cameras, and a magnification ratio between the cameras; and
wherein the processing circuitry is configured to estimate the relative rotation and the magnification ratio based on being configured to:
  obtain one or more projected positions, by projecting one or more reference marker positions as observed in the image from the first camera, into a coordinate system of the second camera; and
  compare the projected positions to corresponding reference marker positions as observed in the image from the second camera.

11. A machine vision system comprising:
interface circuitry configured to obtain a pair of images comprising a current frame from first and second cameras comprising a stereo camera pair, said stereo camera pair imaging a scene containing one or more reference markers; and
processing circuitry operatively associated with the interface circuitry and, during run state operation of the machine vision system, configured to:
  estimate mechanical misalignments in and/or between the first and second cameras, based on comparing current reference marker positions to original reference marker positions, wherein the current reference marker positions are determined from the current frame and the original reference marker positions are known from setup data stored in the machine vision system;
  calculate a worst-case error for stereo vision processing by the machine vision system, as a function of the estimated mechanical misalignments; and
  transition the machine vision system from the run state of operation to a fault state of operation, in response to determining that the worst-case error exceeds a defined threshold;
wherein the processing circuitry is configured to estimate the mechanical misalignments based on being configured to estimate at least one of: a per-camera imager shift, a per-camera magnification change, a relative rotation between the cameras, and a magnification ratio between the cameras; and
wherein the processing circuitry is configured to estimate the worst-case error based on being configured to:
  calculate a first corner move vector as a function of the imager shift and the magnification change of the first camera;
  calculate a second corner move vector as a function of the imager shift and the magnification change of the second camera, and further as a function of the relative rotation between the first and second cameras;
  determine a difference between the first and second corner move vectors; and
  compare the difference to a reference difference corresponding to original first and second corner move vectors known from the setup data.

12. The machine vision system of claim 11, wherein the processing circuitry is configured to calculate the first corner move vector based on being configured to:
  obtain a transformed corner position, by transforming an original image corner position for the first camera from a rectified coordinate system into a distortion-free coordinate system of the first camera, and from the distortion-free coordinate system into a distorted coordinate system of the first camera, the distorted coordinate system of the first camera being a raw coordinate system for the first camera that reflects lens distortion of the first camera;
  compute a moved corner position for the first camera as a function of the transformed corner position and the estimated mechanical misalignments for the first camera;
  obtain a transformed moved corner position for the first camera, by transforming the moved corner position from the distorted coordinate system of the first camera back into the rectified coordinate system; and
  compute the first corner move vector as the difference between the transformed moved corner position and the original image corner position.

13. The machine vision system of claim 11, wherein the processing circuitry is configured to calculate the second corner move vector based on being configured to:
  obtain a projected corner position by obtaining a transformed corner position, based on transforming an original image corner position for the first camera from a rectified coordinate system of the first camera into a distortion-free coordinate system of the first camera, and projecting the transformed corner position into a distortion-free coordinate system of the second camera;
  obtain a second transformed corner position by transforming the projected corner position into a rectified coordinate system of the second camera;
  obtain a third transformed corner position by shifting the projected corner position as a function of the relative rotation between the first and second cameras, and transforming, after said shifting, the projected corner position into a distorted coordinate system of the second camera, shifting the third transformed corner position within the distorted coordinate system as a function of the estimated imager shift and the estimated magnification change as estimated for the second camera;
  obtain a fourth transformed corner position by transforming the third transformed corner position, after said shifting in the distorted coordinate system of the second camera, into the distortion-free coordinate system of the second camera and then into the rectified coordinate system of the second camera; and compute the second corner move vector as the difference between the second transformed corner position and the fourth transformed corner position.

14. A machine vision system comprising:

interface circuitry configured to obtain a pair of images comprising a current frame from first and second cameras comprising a stereo camera pair, said stereo camera pair imaging a scene containing one or more reference markers; and processing circuitry operatively associated with the interface circuitry and, during run state operation of the machine vision system, configured to:

estimate mechanical misalignments in and/or between the first and second cameras, based on comparing current reference marker positions to original reference marker positions, wherein the current reference marker positions are determined from the current frame and the original reference marker positions are known from setup data stored in the machine vision system;

calculate a worst-case error for stereo vision processing by the machine vision system, as a function of the estimated mechanical misalignments; and transition the machine vision system from the run state of operation to a fault state of operation, in response to determining that the worst-case error exceeds a defined threshold;

wherein, with respect to a given reference marker, the processing circuitry is configured to adapt the defined threshold as a function of a position of the reference marker within the involved image or images and a corresponding focus quality profile known for the lenses of the first and second camera.

* * * * *